US011457608B2

(12) United States Patent
Yuan et al.

(10) Patent No.: US 11,457,608 B2
(45) Date of Patent: Oct. 4, 2022

(54) FEEDING APPARATUS AND TROUBLE SHOOTING METHOD THEREOF

(71) Applicant: CHICONY ELECTRONICS CO., LTD., New Taipei (TW)

(72) Inventors: Shang-Yuan Yuan, New Taipei (TW); Tung-Hsin Huang, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 136 days.

(21) Appl. No.: 17/142,748

(22) Filed: Jan. 6, 2021

(65) Prior Publication Data

US 2021/0282367 A1   Sep. 16, 2021

Related U.S. Application Data

(60) Provisional application No. 62/989,175, filed on Mar. 13, 2020.

(30) Foreign Application Priority Data

May 21, 2020  (TW) .................................. 109116975

(51) Int. Cl.
| | | |
|---|---|---|
| *A01K 5/02* | (2006.01) | |
| *G08B 21/18* | (2006.01) | |
| *G08B 5/36* | (2006.01) | |
| *G08B 3/10* | (2006.01) | |

(52) U.S. Cl.
CPC .......... *A01K 5/0291* (2013.01); *G08B 21/182* (2013.01); *G08B 3/10* (2013.01); *G08B 5/36* (2013.01)

(58) Field of Classification Search
CPC ..... A01K 5/0291; A01K 5/02; G01M 99/005; G07B 21/182; G08B 3/10; G08B 5/36
See application file for complete search history.

(56) References Cited

U.S. PATENT DOCUMENTS

| | | | | |
|---|---|---|---|---|
| 2008/0289580 | A1* | 11/2008 | Krishnamurthy | .... A01K 5/0291 119/51.11 |
| 2009/0095223 | A1* | 4/2009 | Szutu | ................... A01K 5/0291 119/51.5 |
| 2014/0103148 | A1* | 4/2014 | Wisecarver | .......... A01K 5/0225 239/681 |

FOREIGN PATENT DOCUMENTS

TW                189929            9/1992

* cited by examiner

*Primary Examiner* — Ojiako K Nwugo
(74) *Attorney, Agent, or Firm* — Muncy, Geissler, Olds & Lowe, P.C.

(57) ABSTRACT

The present disclosure discloses a feeding apparatus, which includes an ejection mechanism, a motion sensor and a control module. The ejection mechanism includes a motor unit and a push rod unit. When the motion sensor detects the movement of the push rod unit, the motion sensor sends a motion signal. The control module includes a driving unit and a timing unit. The driving unit drives the motor unit turning forward and turning reverse. The timing unit stores a predetermined time. When the timing unit receives an action signal, the timing unit starts timing and sends a forward signal to the driving unit to drive the motor unit turning forward. When the timing unit determines that it has exceeded the predetermined time without receiving the action signal, the timing unit sends a reverse signal to the driving unit to drive the motor unit turning reverse.

15 Claims, 6 Drawing Sheets

FEEDING APPARATUS AND TROUBLE SHOOTING METHOD THEREOF

CROSS REFERENCE TO RELATED APPLICATIONS

This application claims priority of Application No. 109116975 filed in Taiwan on May 21, 2020 under 35 U.S.C. § 119; and this application claims priority of U.S. Provisional Application No. 62/989,175 filed on Mar. 13, 2020 under 35 U.S.C. § 119(e), the entire contents of all of which are hereby incorporated by reference.

BACKGROUND

1. Technical Field

The present disclosure relates to a feeding apparatus, more particularly to a trouble shooting mechanism of the feeding apparatus.

2. Description of the Related Art

At present, more and more families or individuals raise pets, but the busy life makes it difficult for pet keepers to feed their pets regularly. In order to solve the problem of the pet keepers being unable to feed their pets when they are outside the home, an automatic feeding apparatus is available on the market. The pet keeper can pour the pet foods directly into the feed storage chamber (material-containing chamber). This kind of feeding apparatus can provide one meal of feed at a predetermined time. In addition to the daily feeding of two or three meals, the pet keeper can interact with their pets by giving them pet food or snack to reward the pets. In this regard, another automatic feeding apparatus capable of flinging pet food toward a pet is commercially available, and this kind of feeding apparatus enhances the interaction between the pet and pet keeper.

This ejection type automatic feeding apparatus (i.e., feeding a pet by flinging food) has a complicated mechanism. For example, a push rod is driven by a motor, and pet food is ejected by the push rod. When the pet food is ejected, it may be stuck in some positions of the ejection mechanism, so that the push rod is unable to move. If the push rod is driven by a DC motor, the fault can be eliminated by detecting the current (current rising when it is stuck). Recently, due to the loud noise generated by DC motor, stepping motor is mostly used to drive the push rod. However, the stepping motor does not have the characteristic of the current rising when the pet food is stuck. Therefore, a new fault detection and troubleshooting mechanism is needed for applying to an automatic feeder (feeding apparatus) using stepping motor.

SUMMARY

In view of the aforesaid drawbacks of the prior art, it is an objective of the present disclosure to provide a feeding apparatus and a troubleshooting method thereof. With the motion sensor detects the movement of the push rod unit, and when the control module determines a predetermined time is exceed without any movement of the push rod unit it drives the motor unit turning reverse, so as to resolve the issue of conventional feeding apparatus of determining fault by detecting the current.

In order to achieve the above object, the present disclosure provides a feeding apparatus, which comprises an ejection mechanism, a motion sensor, and a control module. The ejection mechanism comprises a motor unit and a push rod unit, and the motor unit drives the push rod unit to move. The motion sensor is used for detecting the movement of the push rod unit. The motion sensor sends an action signal when detects the movement of the push rod unit. The control module is electrically connected to the motor unit and the motion sensor. The control module comprises a driving unit and a timing unit. The driving unit drives the motor unit turning forward and turning reverse. The timing unit stores a predetermined time. When the timing unit receives a start signal, it starts timing and sends a forward rotation signal to the driving unit to drive the motor unit turning forward. When the timing unit determines that the predetermined time is exceeded without receiving the action signal, the timing unit sends a revere rotation signal to the driving unit to drive the motor unit turning reverse.

In order to achieve the above object, the present disclosure also provides a troubleshooting method applied to the feeding apparatus. The feeding apparatus comprises an ejection mechanism, a motion sensor and a control module. The ejection mechanism comprises a motor unit and a push rod unit, and the motor unit drives the push rod unit to move. The motion sensor sends an action signal when detects the movement of the push rod unit. The control module comprises a driving unit and a timing unit. The driving unit drives the motor unit turning forward and turning reverse. The troubleshooting method comprises the following steps: when the timing unit receives a start signal, the timing unit starts timing and sends a forward signal to the driving unit; the driving unit drives the motor unit turning forward; when the timing unit determines that a predetermined time is exceeded without receiving an action signal, the timing unit sends a revere rotation signal to the driving unit; and the driving unit drives the motor unit turning reverse.

According to one embodiment of the present disclosure, the feeding apparatus further comprises a discharge port. When the driving unit drives the motor unit turning forward, the motor unit drives the push rod unit to move in the direction of the discharge port, and the timing unit receives the action signal from the motion sensor.

According to one embodiment of the present disclosure, when the driving unit drives the motor unit turning reverse, the motor unit drives the push rod unit to move away from the discharge port.

According to one embodiment of the present disclosure, when the timing unit determines that a predetermined time is exceeded without receiving an action signal, the timing unit stores a fault data and sends the forward rotation signal to the driving unit after a restart interval.

According to one embodiment of the present disclosure, when the timing unit determines that the predetermined time is exceeded without receiving the action signal, the following steps are further taken: the timing unit stores a fault data, and the timing unit sends a forward rotation signal to the driving unit after a restart interval.

According to one embodiment of the present disclosure, the timing unit deletes the fault data after receiving the action signal from the motion sensor.

According to one embodiment of the present disclosure, the troubleshooting method further includes the following steps: the timing unit deletes the fault data after receiving the action signal from the motion sensor.

According to one embodiment of the present disclosure, the timing unit further stores a cumulative number of faults.

When the number of fault data stored in the timing unit is greater than the cumulative number of faults, the timing unit sends a warning signal.

According to one embodiment of the present disclosure, the timing unit further stores a cumulative number of faults, and the troubleshooting method further includes the following steps: when the number of fault data stored in the timer unit is greater than the cumulative number of faults, the timing unit sends a warning signal.

According to one embodiment of the present disclosure, the feeding apparatus further includes a warning element, which is electrically connected to the control module to receive the warning signal from the timing unit.

According to one embodiment of the present disclosure, the motion sensor comprises a trigger disposed on the moving path of the push rod unit. The push rod unit contacts the trigger when it moves, to allow the motion sensor to send the action signal.

According to one embodiment of the present disclosure, the motion sensor is an optical switch comprising a light emitter and a light receiver. The light emitter and the light receiver are respectively disposed on two opposite sides of the moving path of the push rod unit, and the push rod unit triggers the optical switch when it moves.

As described above, according to the feeding apparatus and the troubleshooting method of the present disclosure, the feeding apparatus comprises an ejection mechanism, a motion sensor and a control module. The motion sensor detects the movement of the push rod unit and sends an action signal to the control module. When the timing unit receives a start signal, the timing unit starts timing and drives the motor unit to turning forward. When the timing unit determines that a predetermined time is exceeded without receiving the action signal, it drives the motor unit turning reverse to eliminate the fault (stuck) problem.

BRIEF DESCRIPTION OF THE DRAWINGS

In the drawings, wherein similar reference numerals denote similar elements throughout the several views.

DETAILED DESCRIPTION OF THE PREFERRED EMBODIMENT

In order to make the structure and characteristics as well as the effectiveness of the present disclosure to be further understood and recognized, detailed description of the present disclosure is provided as follows along with embodiments and accompanying figures.

Figure 1:
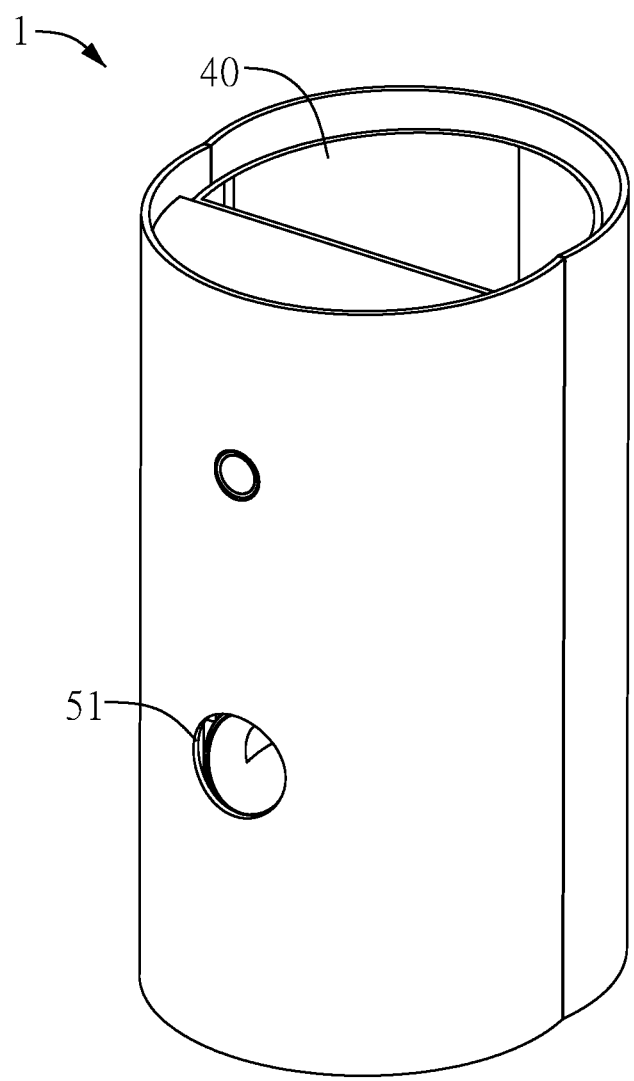
FIG. 1 is a schematic diagram of the feeding apparatus of the first embodiment of the present disclosure.
Figure 2:
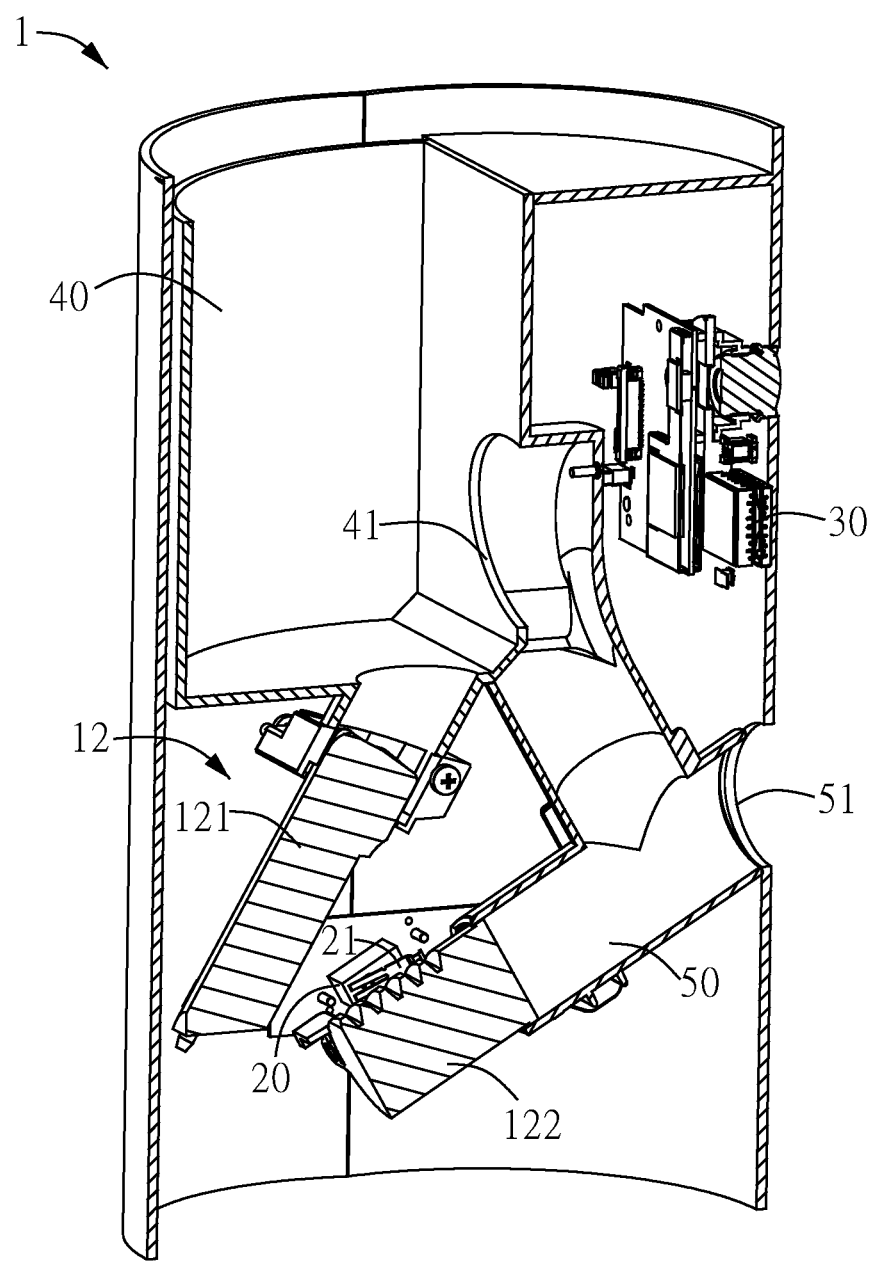
FIG. 2 is a schematic sectional view of the feeding apparatus shown in FIG. 1.
Figure 3:
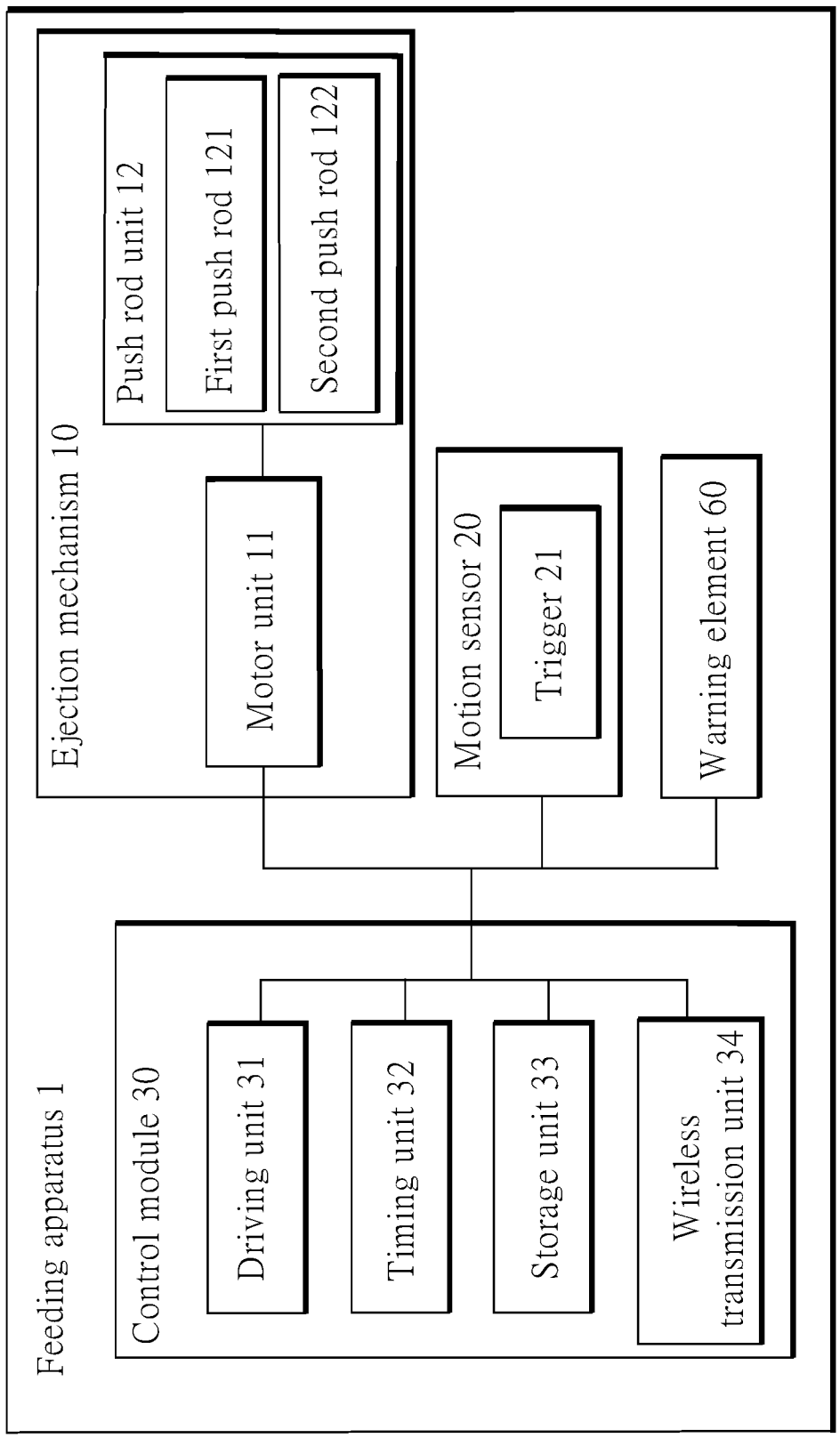
FIG. 3 is a block diagram of the feeding apparatus shown in FIG. 1.

FIG. 1 is a schematic diagram of the feeding apparatus of the first embodiment of the present disclosure, FIG. 2 is a schematic sectional view of the feeding apparatus shown in FIG. 1, and FIG. 3 is a block diagram of the feeding apparatus shown in FIG. 1. Please refer to FIG. 1, FIG. 2 and FIG. 3. First of all, the feeding apparatus 1 of the present embodiment is applied to an ejection type automatic feeding apparatus to throw the pet food to the pet to be fed for achieving the effect of feeding and funny interaction with the pet at the same time. In this embodiment, pet foods or snacks are referred to as material. In other embodiments, the material can also be a toy for pets. The user (the pet keeper) can place the feeding apparatus 1 in a living room or a pet's game room, and can throw pet food regularly or control the throwing action of the feeding apparatus 1 in a remote control manner.

The feeding apparatus 1 of this embodiment comprises an ejection mechanism 10, a motion sensor 20 and a control module 30. The ejection mechanism 10 comprises a motor unit 11 and a push rod unit 12, and the motor unit 11 drives the push rod unit 12 to move. It should be noted that the push rod unit 12 of this embodiment comprises a first push rod 121 and a second push rod 122. The motor unit 11 can sequentially drive the first push rod 121 and the second push rod 122 through a gear mechanical structure. Preferably, the motor unit 11 can be a stepping motor. In other embodiments, it can also be other types of motors, and will not be limited by the present disclosure.

Specifically, the feeding apparatus 1 of this embodiment further comprises a storage chamber 40 and a discharge channel 50. The storage chamber 40 is used to accommodate the material (such as pet food). The first push rod 121 is disposed on the bottom side of the storage chamber 40. The storage chamber 40 has a discharge port 41 located between the storage chamber 40 and the discharge channel 50. In addition, the second push rod 122 is disposed in the discharge channel 50. The discharge channel 50 also has a discharge port 51 communicating with the outside. In other words, the feeding apparatus 1 of the present embodiment has two discharge ports 41, 51, which are respectively located in the storage chamber 40 and the discharge channel 50. It should be noted that the present disclosure does not limit the numbers of the motors and the push rods, which can be adjusted according to the structure of the ejection mechanism 10.

When the feeding apparatus 1 starts (throwing) action, the first push rod 121 can first push the materials located in the storage chamber 40 to the discharge port 41, such that a portion of material can be pushed to the discharge channel 50. Then, the second push rod 122 located in the discharge channel 50 can further push the material to the discharge port 51 in order to eject the material out of the feeding apparatus 1.

The motion sensor 20 of the present embodiment is used to detect the movement of the push rod unit 12. This embodiment is not limited to detect the movement of the first push rod 121 located in the storage chamber 40 or the second push rod 122 located in the discharge channel 50. Preferably, it detects the movement of the second push rod 122 located in the discharge channel 50. In other embodiments, two motion sensors 20 can also be provided to detect the movement of the first push rod 121 and the second push rod 122 respectively. The following takes the motion sensor 20 detect the movement of the second push rod 122 located in the discharge channel 50 as an example.

When the motion sensor 20 detects the movement of the second push rod 122, it can generate and send an action signal. Specifically, the motion sensor 20 of this embodiment comprises a trigger 21 disposed on the moving path of the second push rod 122. For example, the motion sensor 20 can be a mechanical, capacitive, resistive, or electromagnetic switch, and the trigger 21 can be an elastic piece located on the moving path of the second push rod 122. When the second push rod 122 moves, it passes through the position of the trigger 21 and is able to contact or press the trigger 21, making the motion sensor 20 generate and send an action signal.

Figure 4:
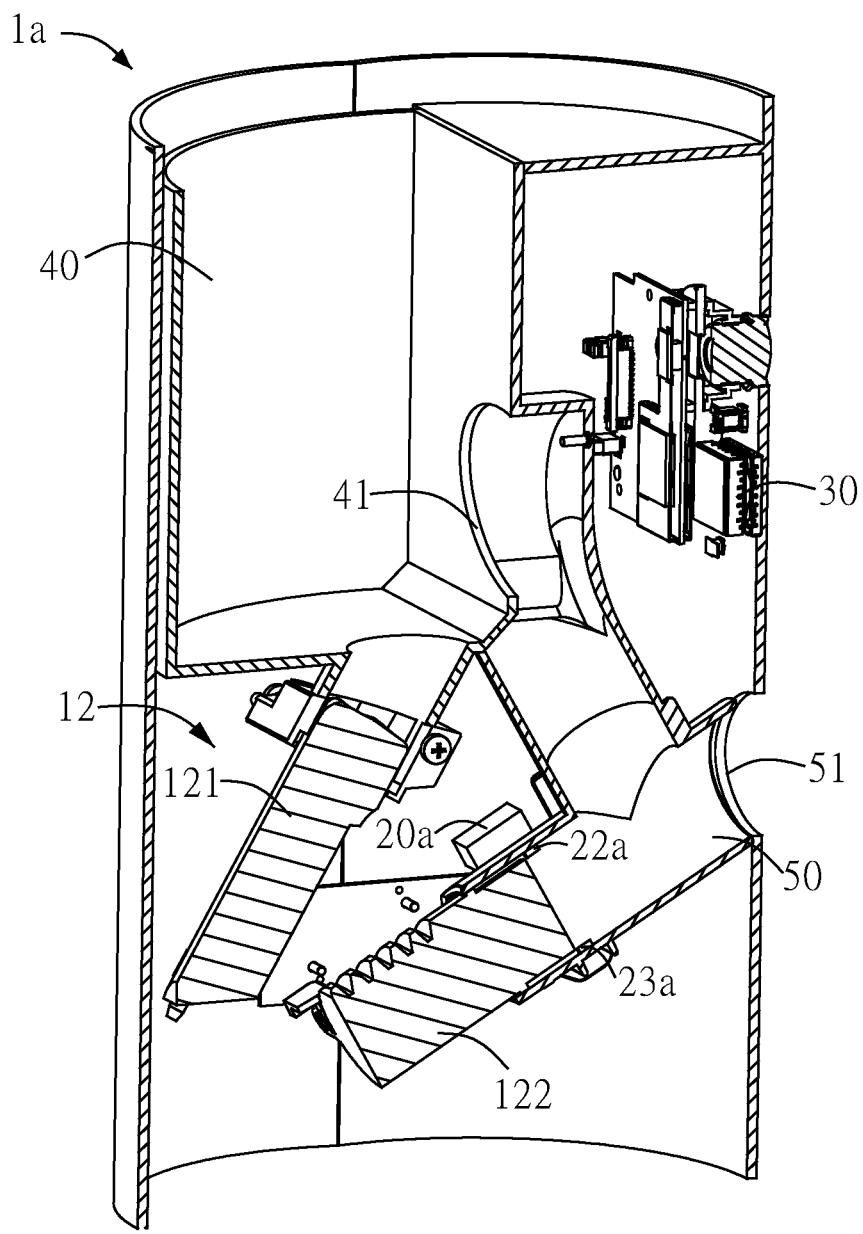
FIG. 4 is a schematic sectional view of the feeding apparatus of the second embodiment of the present disclosure.

FIG. 4 is a schematic sectional view of the feeding apparatus of the second embodiment of the present disclosure. Please refer to FIG. 4. In this embodiment, the motion sensor 20a can also be an optical switch, comprising a light emitter 22a and a light receiver 23a. The light transmitter 22a and the light receiver 23a are respectively disposed on two opposite sides of the moving path of the second push rod 122, such that the second push rod 122 can be used as a light interrupter. Specifically, when the feeding apparatus 1 is in a stationary state (no movement), the light emitter 22a continuously emits light toward the light receiver 23a. When the second push rod 122 moves and passes between the light emitter 22a and the light receiver 23a, the second push rod 122 interrupts the light emitted by the light emitter 22a, and then triggers the optical switch to correspondingly generate and send an action signal. The other elements of this embodiment are the same as those of the first embodiment. Please refer to the description of the first embodiment.

As shown in FIG. 3, the control module 30 of this embodiment is electrically connected to the motor unit 11 and the motion sensor 20 for signal and data transmission. The control module 30 comprises a driving unit 31 and a timing unit 32, wherein the driving unit 31 drives the motor unit 11 turning forward and turning reverse. When the driving unit 31 drives the motor unit 11 to rotate forward, the motor unit 11 first drives the first push rod 121 to move in the direction of the discharge port 41, thereby making the ejection mechanism 10 push a few materials to the discharge channel 50. Then, the motor unit 11 drives the second push rod 122 to move in the direction of the discharge port 51, thereby making the ejection mechanism 10 eject the materials out of the feeding apparatus 1. Conversely, when the driving unit 31 drives the motor unit 11 to rotate reversely, the motor unit 11 drives the second push rod 122 to move away from the discharge port 51, and drives the first push rod 121 to move away from the discharge port 41. In other words, the motor unit 11 drives the push rod unit 12 moving in the reverse direction.

It should be noted that the above control module 30 and each relevant unit, in addition to being configured as a hardware device, software program, firmware or a combination thereof, can also be configured by circuit loops or other appropriate types. The connection between each unit is wired or wirelessly connected for data reception and transmission; each unit can be configured separately or in a combined manner. Furthermore, this embodiment only exemplifies a preferred embodiment of the present disclosure, and does not describe all possible variations and combinations in detail to avoid repetition. However, those skilled in the art should understand that not all of the above modules or units are necessary. In order to implement the disclosure, other more detailed conventional modules or units may also be included, and each module or unit may be omitted or modified as necessary.

Figure 5:
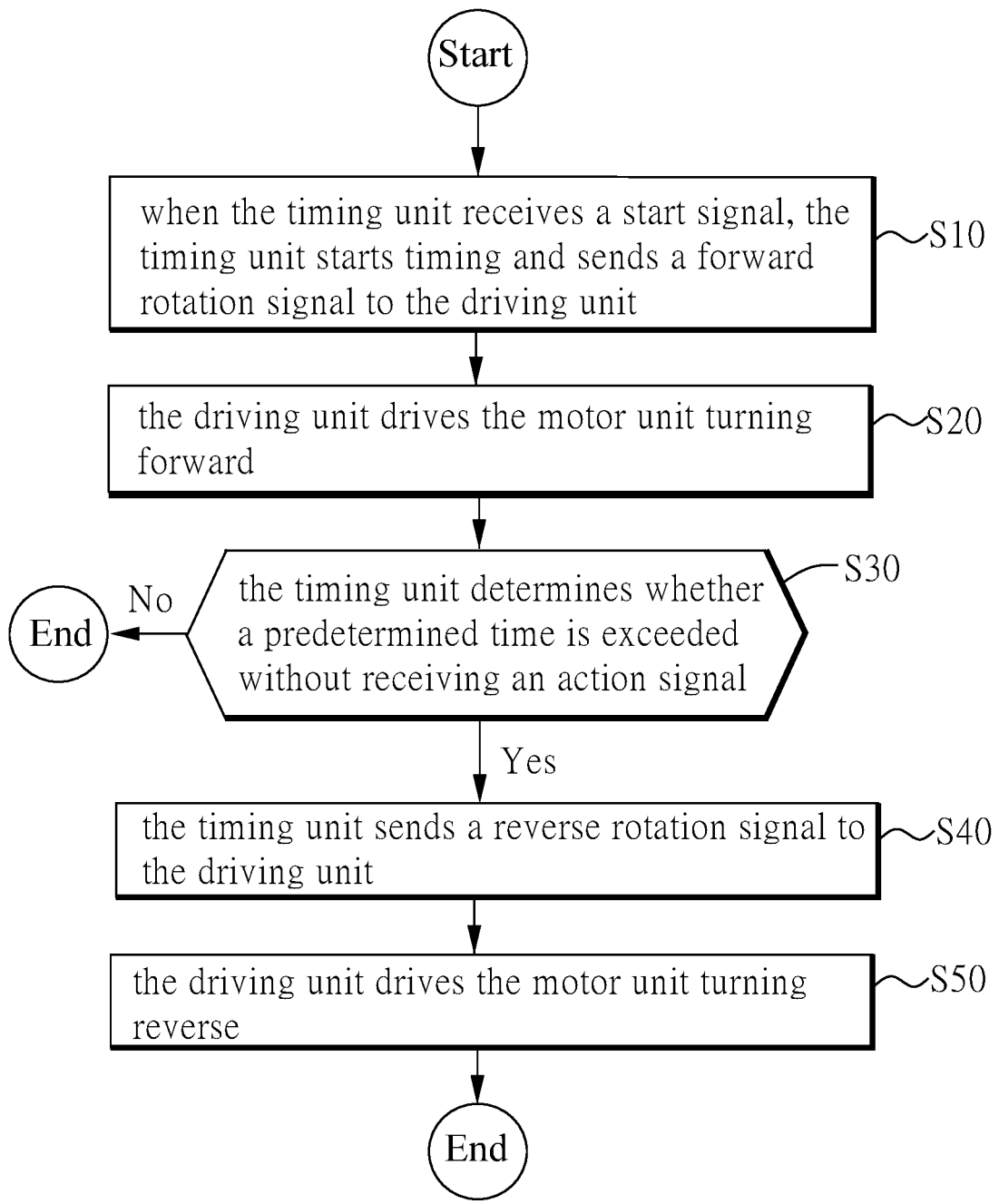
FIG. 5 is a schematic flow diagram of the troubleshooting method of the first embodiment of the present disclosure.

In this embodiment, the control module 30 may also include a storage unit 33, which stores a troubleshooting method, and the method is executed by the feeding apparatus 1. The action of the feeding apparatus 1 is further described in the following according to the steps of the troubleshooting method. FIG. 5 is a schematic flow diagram of the troubleshooting method of the first embodiment of the present disclosure. Please refer to FIG. 2, FIG. 3 and FIG. 5.

Step S10: when the timing unit 32 receives a start signal, the timing unit 32 starts timing and sends a forward rotation signal to the driving unit 31.

The control module 30 of this embodiment further comprises a wireless transmission unit 34. The user (pet keeper) can operate a communication device (such as a smart phone or a computer, etc.) to send the start signal, which is received by the wireless transmission unit 34. In other words, the action of the feeding apparatus 1 can be started in a remote control manner. In addition, the feeding apparatus 1 can also have a physical switch electrically connected to the control module 30. When the switch is turned on, a start signal is generated.

When the timing unit 32 receives the start signal, it starts timing and sends a forward rotation signal to the driving unit 31 to drive the motor unit 11 turning forward.

Step S20: the driving unit 31 drives the motor unit 11 turning forward.

As mentioned above, when the driving unit 31 drives the motor unit 11 turning forward, the motor unit 11 first drives the first push rod 121 located on the bottom side of the storage chamber 40 to move in the direction of the discharge port 41 in order to push a portion of material to the discharge channel 50. Then, the motor unit 11 drives the second push rod 122 located in the discharging channel 50 to move in the direction of the discharge port 51 to eject the material out of the feeding apparatus 1. It should be noted that the difference in driving time can be adjusted according to the time of the movement of the first push rod 121, which is not particularly limited by the present disclosure.

If the push rod unit 12 (the first push rod 121 and the second push rod 122) operates normally, the motion sensor 20 provided on the moving path of the second push rod 122 can detect the movement of the second push rod 122, and then generate and send an action signal to the timing unit 32. If a fault occurs, for example, the material stuck in the discharge port 41, the second push rod 122 cannot smoothly move in the direction of the discharge port 51, so that the motion sensor 20 will not generate action signal.

Step S30: the timing unit 32 determines whether a predetermined time is exceeded without receiving an action signal.

The timing unit 32 stores a predetermined time. The predetermined time is the time required for the motor unit 11 and the push rod unit 12 to operate smoothly, such as 5 seconds, so the predetermined time can be preset as 5 seconds. When the timing unit 32 receives the start signal, it starts timing (Step S10). If the motion sensor 20 receives an action signal within the predetermined time (5 seconds), it implies that the feeding apparatus 1 is operating normally, and no more steps are needed to execute. On the contrary, if no action signal is received from the motion sensor 20 after the predetermined time (5 seconds), it implies that the feeding apparatus 1 has a fault (stuck) and needs to be eliminated, and then Step S40 is executed.

Step S40: the timing unit 32 sends a reverse rotation signal to the driving unit 31.

When the timing unit 32 determines that the predetermined time (5 seconds) is exceeded and no action signal is received, it implies that the feeding apparatus 1 has a fault and needs to be eliminated, and the timing unit 32 sends a reverse rotation signal to the driving unit 31 to drive the motor unit 11 turning reverse.

Step S50: the driving unit 31 drives the motor unit 11 turning reverse.

When the driving unit 31 drives the motor unit 11 turning reverse, the motor unit 11 can first drive the second push rod 122 to move away from the discharge port 51, and then drive the first push rod 121 to move away from the discharge port 41, so as to eliminate the fault (stuck) problem.

Figure 6:
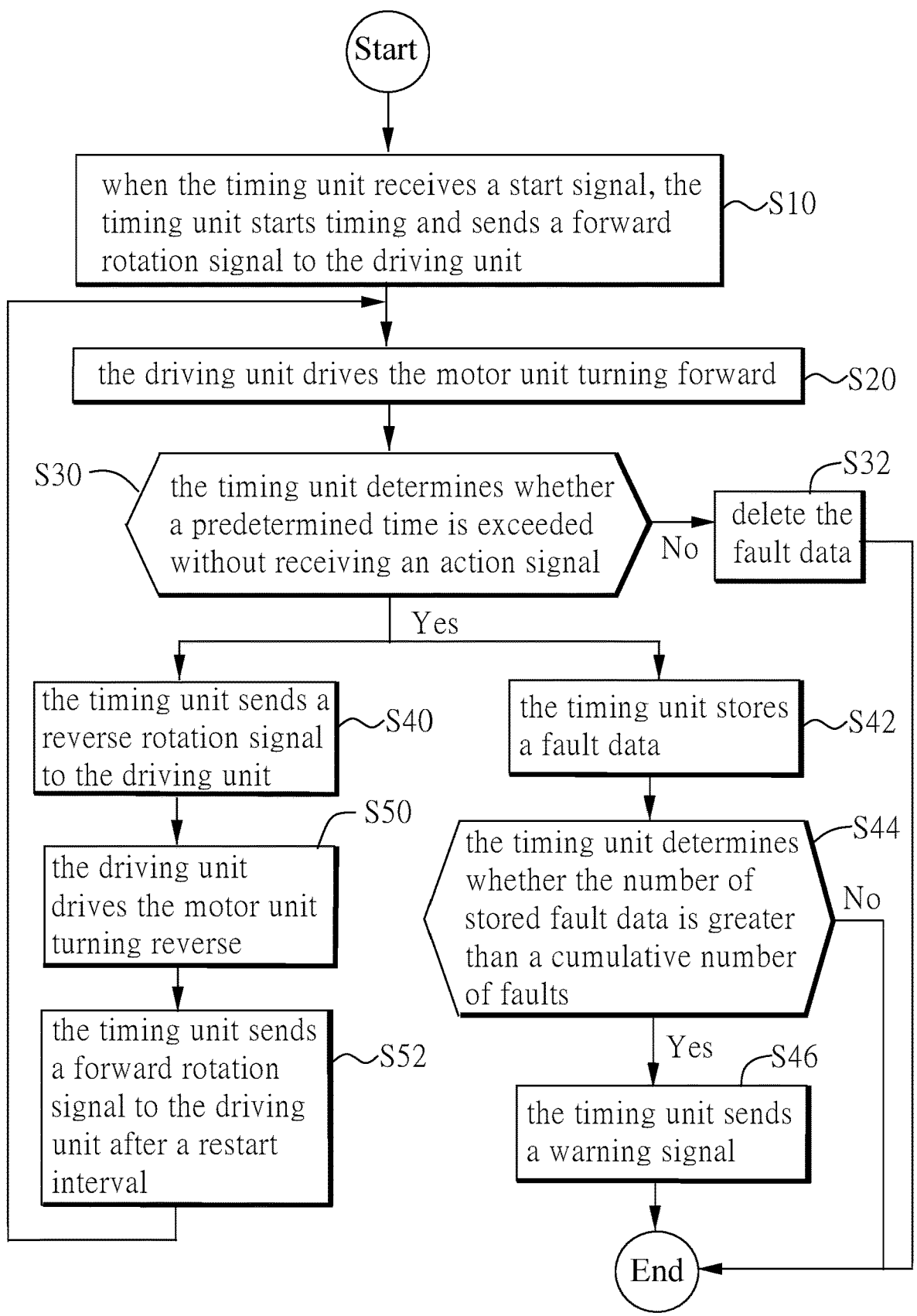
FIG. 6 is a schematic flow diagram of the troubleshooting method of the second embodiment of the present disclosure.

FIG. 6 is a schematic flow diagram of the troubleshooting method of the second embodiment of the present disclosure. Please refer to FIG. 2, FIG. 3 and FIG. 6. Preferably, the troubleshooting method of this embodiment further includes the step of recording the number of faults. In the case that the fault cannot be eliminated for multiple times, a warning can be issued to notify the user to perform manual processing. Therefore, the Steps S10, S20, S30, S40, and S50 of this embodiment are the same as those of the first embodiment, and include the following steps.

Step S42: the timing unit 32 stores a fault data.

When the timing unit 32 determines that no action signal is received after a predetermined time (5 seconds) (in Step S30), in addition to transmitting a reverse rotation signal to the driving unit 31 (Step S40), the timing unit 32 also stores a piece of fault data (Step S42).

Step 52: the timing unit 32 sends a forward rotation signal to the driving unit 31 after a restart interval.

After the timing unit 32 sends a reverse rotation signal to the driving unit 31 (Step S40) and stores a piece of fault data (Step S42), the timing unit 32 waits for a restart interval, which is the time (e.g., 5 seconds) required for the driving unit 31 to drive the motor unit 11 turning reverse and cause the push rod unit 12 to reverse action (Step S50). After the restart interval (5 seconds) has elapsed, the first push rod 121 and the second push rod 122 return to the stationary state before actuation. At this time, the timing unit 32 sends a forward rotation signal to the driving unit 31, and repeatedly executes Step S20 (the driving unit 31 drives the motor unit 11 turning forward) and Step S30 (the timing unit 32 determines whether no action signal is received after a predetermined time).

As mentioned above, if the timing unit 32 receives an action signal from the motion sensor 20 within the predetermined time, it implies that the feeding apparatus 1 is operating normally, so the stored fault data will be deleted (Step S32, delete the fault data). If the motion sensor 20 receives no action signal after the predetermined time, it implies that the feeding apparatus 1 still has a fault (stuck) and needs to be eliminated, and then proceed with Step S40 and Step S42.

Step S44: the timing unit 32 determines whether the number of stored fault data is greater than a cumulative number of faults.

When the aforementioned timing unit 32 determines that no action signal is received after a predetermined time (5 seconds) (in Step S30), the timing unit 32 stores a piece of fault data (in Step S42). The timing unit 32 of this embodiment further stores a cumulative number of faults, which is the number of consecutive faults notified to manual removal of the faults. For example, the cumulative number of faults can be preset to 3 times. Each time the timing unit 32 stores a piece of fault data (in Step S42), it also determines whether the number of stored fault data (number of records) is greater than the cumulative number of faults (in Step S44). If the number of fault data stored in the timing unit 32 is greater than the cumulative number of faults (3 times), it implies that fault has occurred for three consecutive times for the feeding apparatus 1, so Step S46 is executed.

Step S46: timing unit 32 sends a warning signal.

In some embodiments, the timing unit 32 can send the warning signal to the wireless transmission unit 34, and the wireless transmission unit 34 sends the warning signal to the user's communication device to notify the user that the feeding apparatus 1 fails to perform self-troubleshooting, and allow the user to intervene to manually eliminate the problems. In some embodiments, the feeding apparatus 1 further comprises a warning element 60 electrically connected to the control module 30. The warning element 60 can be, for example, but not limited to, a light-emitting element or a sound playback element, etc. The warning element 60 receives a warning signal from the timing unit 32, and can emit light or sound to remind the user that the feeding apparatus 1 fails to perform self-troubleshooting.

As described above, according to the feeding apparatus and the troubleshooting method of the present disclosure, the feeding apparatus comprises an ejection mechanism, a motion sensor, and a control module. The motion sensor detects the movement of the push rod unit, and sends the action signal to the control module. When the timing unit receives the start signal, the timing unit starts timing and drives the motor unit turning forward. When the timing unit determines that no a predetermined time is exceeded without receiving the action signal, it drives the motor unit turning reverse to eliminate the fault (stuck) problem.

Although the disclosure has been explained in relation to its preferred embodiment, it is to be understood that many other possible modifications and variations can be made without departing from the spirit and scope of the disclosure as hereinafter claimed.

What is claimed is:

1. A feeding apparatus, comprising:
    an ejection mechanism comprising a motor unit and a push rod unit, the motor unit driving the push rod unit to move;
    a motion sensor used for detecting the movement of the push rod unit, the motion sensor sending an action signal when detecting the movement of the push rod unit; and
    a control module electrically connected to the motor unit and the motion sensor, and the control module comprising:
        a driving unit for driving the motor unit turning forward and turning reverse; and
        a timing unit storing a predetermined time, wherein when the timing unit receives a start signal, which starts timing and sends a forward rotation signal to the driving unit to drive the motor unit turning forward; when the timing unit determines that the predetermined time is exceeded without receiving the action signal, the timing unit sends a revere rotation signal to the driving unit to drive the motor unit turning reverse.

2. The feeding apparatus as claimed in claim 1, further comprising:
    a discharge port; when the driving unit drives the motor unit turning forward, the motor unit drives the push rod unit to move in the direction of the discharge port, and the timing unit receives the action signal from the motion sensor.

3. The feeding apparatus as claimed in claim 2, wherein when the driving unit drives the motor unit turning reverse, the motor unit drives the push rod unit to move away from the discharge port.

4. The feeding apparatus as claimed in claim 1, wherein when the timing unit determines that the predetermined time is exceeded without receiving the action signal, the timing unit stores a fault data and sends the forward rotation signal to the driving unit after a restart interval.

5. The feeding apparatus as claimed in claim 4, wherein the timing unit deletes the fault data after receiving the action signal from the motion sensor.

6. The feeding apparatus as claimed in claim 5, wherein the timing unit further stores a cumulative number of faults, when the number of fault data stored in the timing unit is greater than the cumulative number of faults, the timing unit sends a warning signal.

7. The feeding apparatus as claimed in claim 6, further comprising:
   a warning element electrically connected to the control module to receive the warning signal from the timing unit.

8. The feeding apparatus as claimed in claim 1, wherein the motion sensor comprises a trigger disposed on the moving path of the push rod unit, the push rod unit contacts the trigger when it moves, to allow the motion sensor to send the action signal.

9. The feeding apparatus as claimed in claim 1, wherein the motion sensor is an optical switch comprising a light emitter and a light receiver, the light emitter and the light receiver are respectively disposed on two opposite sides of the moving path of the push rod unit, the push rod unit triggers the optical switch when it moves.

10. A troubleshooting method applied to a feeding apparatus, which comprises an ejection mechanism, a motion sensor and a control module; the ejection mechanism comprising a motor unit and a push rod unit, and the motor unit driving the push rod unit to move; the motion sensor sending an action signal when detecting the movement of the push rod unit; the control module comprising a driving unit and a timing unit, the driving unit driving the motor unit turning forward and turning reverse; the troubleshooting method comprising the following steps:
   when the timing unit receiving a start signal, the timing unit starting timing and sending a forward signal to the driving unit;
   the driving unit driving the motor unit turning forward;
   when the timing unit determining that a predetermined time is exceeded without receiving an action signal, the timing unit sending a revere rotation signal to the driving unit; and
   the driving unit driving the motor unit turning reverse.

11. The troubleshooting method as claimed in claim 10, wherein the feed apparatus further comprises a discharge port; when the driving unit drives the motor unit turning forward, the motor unit drives the push rod unit to move in the direction of the discharge port, and the timing unit receives the action signal from the motion sensor.

12. The troubleshooting method as claimed in claim 11, wherein when the driving unit drives the motor unit turning reverse, the motor unit drives the push rod unit to move away from the discharge port.

13. The troubleshooting method as claimed in claim 10, wherein when the timing unit determines that the predetermined time is exceeded without receiving the action signal, the following steps are further taken:
   the timing unit stores a fault data; and
   the timing unit sends a forward rotation signal to the driving unit after a restart interval.

14. The troubleshooting method as claimed in claim 13, further comprising the following steps:
   the timing unit deletes the fault data after receiving the action signal from the motion sensor.

15. The troubleshooting method as claimed in claim 14, wherein the timing unit further stores a cumulative number of faults, the troubleshooting method further includes the following steps:
   when the number of fault data stored in the timing unit is greater than the cumulative number of faults, the timing unit sends a warning signal.

* * * * *